(12) United States Patent
Baisley et al.

(10) Patent No.: US 6,292,932 B1
(45) Date of Patent: Sep. 18, 2001

(54) SYSTEM AND METHOD FOR CONVERTING FROM ONE MODELING LANGUAGE TO ANOTHER

(75) Inventors: Donald Edward Baisley, Laguna Hills; Sridhar Srinivasa Iyengar, Irvine; Ashit Sawhney, Lake Forest, all of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/322,137

(22) Filed: May 28, 1999

(51) Int. Cl.[7] ....................................................... G06F 9/45
(52) U.S. Cl. ................................. 717/1; 717/5; 707/100
(58) Field of Search ..................... 717/1, 2, 3, 5; 707/3, 4, 10, 100, 103, 513; 709/315, 316

(56) References Cited

U.S. PATENT DOCUMENTS 6,038,393 * 3/2000 Iyengar et al. .................. 395/701
6,170,081 * 1/2001 Fontana et al. .................. 717/1
6,208,345 * 3/2001 Sheard et al. .................. 345/356

OTHER PUBLICATIONS

Taft, "Rational, supporters push object standards", Computer Reseller news, Mar. 1997, pp 107–108.*
Reed, "The Unified Modeling Language takes shape", DBMS, Jul. 1998, pp 47–54.*
Siegel, "OMG overview: CORBA nad the OMA in enterprise computing", COmm. of the ACM, Oct. 1998, pp 37–43.*
Grimes, "object?Relational", DBMS, Apr. 1998, pp 51–55.*

\* cited by examiner

Primary Examiner—Kakali Chaki
(74) Attorney, Agent, or Firm—Alfred W. Kozak; Mark T. Starr; Lisa A. Rode (57) ABSTRACT

In a computing system having a repository program being executed by said system and a means for storing data, a method is disclosed for converting a UML model to a MOF model within the repository. This method includes the steps of selecting a package within the UML model, hereafter UML package, to be exported to the MOF model. Next, the UML package and its elements are exported to the MOF model. After this, relations are recursively set between MOF objects of the UML package that correspond to relations between UML objects in the package; and, MOF reference objects are created for navigable MOF association ends.

25 Claims, 9 Drawing Sheets

ND METHOD FOR CONVERTING
FROM ONE MODELING LANGUAGE TO
ANOTHER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented programming; and, in particular to a method and system for converting from object models existing in the Uniform Modeling Language to models existing in the Meta Object Facility language.

BACKGROUND OF THE INVENTION

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse, and tool and technology models may be developed to manipulate the tool information in the repository. However, the transferring of data within models from tool to tool or from a tool to the repository has been a cumbersome and unyielding task for a long time.

Repository models typically contain classes, datatypes and messages. As more and more complex models are being built, the need arises for a method and system to transfer data in a model from place to place, e.g., to a tool that understands the UML ("Unified Modeling Language"). The present invention solves this problem by converting a model existing in the UML to a model in MOF ("Meta Object Facility"), which is used in may repositories today.

Accordingly, there is a need for an automatic method and system for converting from object models existing in the Uniform Modeling Language to models existing in the Meta Object Facility language. Moreover, since there are many characteristics in UML that have no equivalent in a MOF model, it is not possible to simply apply an automatic set of rules that generates a MOF model from any UML model. However, if a UML model is carefully crafted as a physical model, with the necessary information included, that model should be automatically convertible to a MOF model.

SUMMARY OF THE INVENTION

It is an object of the present invention to provide a reliable system and method that automatically converts a model existing in the UML to a MOF model.

Another object of the present invention is to provide a set of rules for making a transformation from a UML model to a MOF model.

Yet another object of the present invention is to provide a system and method that is capable of manipulating a UML model by adding additional information, and in the transformation to a MOF model recording any other information as tags in the UML model or as an external representation.

Still another object of the present invention is to provide a system and method that provides predictable mapping between an original UML model to a MOF model. This is possible because a UML model plus any tags and external information will always yield the same MOF model.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

The prefix "meta" as used herein shall describe a relationship. For example, "meta-data" describes data. In a similar fashion, a meta-object is an object that represents "meta-data"; and, "meta-model" means a model that defines an abstract language for expressing other models. A "meta-meta-model" means a model that defines an abstract language for expressing meta-models. The relationship between a meta-meta-model and a meta-model is analogous to the relationship between a meta-model and a model. The term model is generally used herein to denote a description of something in the real world. The concept of a model is highly fluid, and depends upon one's point of view. For example, where one is building an entire system, a model may include all of the metadata for the system. On the other hand, others are only concerned with certain components (e.g. programs A and B) or certain kinds of detail (e.g. wiring diagrams) of the system.

The Unified Modeling Language, or "UML", provides the well-known modeling language supported by an ever-growing set of tools. Naturally, UML may be used to model metamodels, which will later need to be translated into MOF metamodels. The present invention provides a set of rules for making such a transformation. There are two major challenges to transforming a metamodel represented as a UML model into an equivalent metamodel represented as a MOF model:

1) UML, having much more diverse uses, allows a model to be at a logical level, with details omitted; and, 2) the MOF requires some information that is not represented in UML.

There are numerous characteristics in the UML that have no equivalent in the MOF. However, the assumption of these transformation rules are that those characteristics were not employed in the source metamodel. Accordingly, it is not possible to simply apply an automatable set of rules that generates a MOF Model from any UML model. However, if a UML model is carefully crafted as a physical model, with all the required information included, then it should be possible to automatically convert the same to a MOF model.

The preferred transformation approach is to manipulate the UML model and then add any additional information. Hence, in the transformation process, any other information needed can be recorded, either as tags in the UML model or in an external representation. In this manner, the UML model plus any tags plus any external information will always yield the same MOF model. This predictable mapping is needed when the original UML representation of the metamodel will continue to exist and be updated.

Data Types

Elements of the UML model that are intended to represent data types are mapped to instances of MOF DataType, using the following rules:

1. For each primitive type, a MOF DataType is defined as an alias for a built-in type capable of representing the full range of values expected for the extent of the data type. Alternately, the primitive types may be mapped directly to the built-in type.

2. For enumerated types, where a MOF built-in type exists with the same range of values, the MOF built-in type is used (note that this only applies to data types representing a Boolean value).

3. For UML data types that are enumerations, map to a MOF DataType instance representing the enumeration.

4. For data types with attributes, map to a MOF DataType representing a corresponding structure.

5. However, for data types that contain a single attribute, which does not denote significant meaning beyond the data type itself, the attribute may be ignored. In this case, the type of the attribute is used to determine a direct mapping from the UML data type to the a MOF data type, representing an alias of the mapped type. For instance, a data type Name, with a single attribute body, of type String, under the normal rules above would be mapped to a MOF data type representing a structure with a single field of type string. The data type is mapped to a MOF data type representing an alias of the built-in type, string.

6. For inherited data types that do not add attributes in derived data types, map the derived attributes to aliases of the supertype. This is necessary because the MOF, by constraint, does not support subtyping of the data type element.

7. For inherited data types that do add attributes, define as a new data type, including inherited attributes.

For data types defined as composites (i.e., composite end of an Association with one or more other data types), define as a sequence. If the multiplicity at the component end is unbounded, then the sequence is unbounded. Otherwise, the sequence size is the upper multiplicity.

Navigability Mapping

If the UML metamodel does not define any navigability (all AssociationEnds have an attribute isNavigable set to true), then it is useful to define a more restrictive navigability in the MOF model. The purpose is to support reuse of any extension of models, based on the metamodel. Consider a metamodel with two classes A, and B, and an Association R between them.

Now consider a defined model that includes an instance of A. If it is desirable to later create an additional model (as a separate model or as an extension of the original model, depending on the capabilities defined in the metamodel) that contains a B, and an R link between the A and B instance, then the navigability from A to B should be prohibited. The reason for this is that model A does not depend from model B but model B depends from model A.

For composite Associations, navigability may be left unrestricted, since it is not possible to create links of composite Associations from existing models to new models.

Naming

UML does not require that each element be given a name, as required by MOF. Although it is always possible to generate a name for each unnamed element, but generated names often do not serve the purpose of describing the named element. Therefore, it is preferable to have useful names, given by the modelers or other domain experts, for generated names. It is important to note that modelers may consciously avoid naming elements to avoid cluttering up UML Class diagrams. However, the UML Notation allows the suppression and filtering of information presentation. So, if a tool does not support control over the presentation of names, the modeler can perform workarounds, such as placing the names in tags. Concerns over presentation should not drive the exclusion of names in the metamodel.

AssociationEnd Naming

When an AssociationEnd is not named, the end's type may often be a suitable name. The name typically defines the role an instance plays in a link of the Association. For Associations where both ends are of the same type, the AssociationEnd names are essential for understanding the role being played by the specific end.

1. Where the name is provided in the UML model, that name is used.
2. Were the name is omitted from both ends, and both ends are of the same type, the modeler or other domain expert must supply at least one end's name.
3. Where the name is omitted from both ends, and there exists one or more other Associations with ends having the same types as the types of these ends, then the modeler or other domain expert must name at least one end.
4. In absence of the above conditions, the AssociationEnd name is derived from the type of the end, given the same name as the type name, except that the first letter is made lower case.
5. If a generated name, from the above rule, violates the constraints of UML, then the preferred resolution is for the modeler or other domain expert to use explicit naming. Otherwise, a numeral may be appended to the offending name.

Reference Naming

A UML metamodel will not have references defined, therefore there will be no reference names in a UML-represented metamodel. Reference names may be represented in UML by tags on the corresponding Association-Ends. The following rules apply (only to binary associations):

1. When an AssociationEnd has its isNavigable attribute set to true, then the End's specification is given a Reference, with this End as the Reference's referencedend. If that AssociationEnd has a reference tag, the name held be that tag becomes the name of the Reference.
2. When no reference tag exists, and the AssociationEnd is single-valued (multiplicity.upper=1), then the name of the Reference is the same as the name of the AssociationEnd.
3. When no reference tag exists, and the AssociationEnd is multi-valued, the Reference name is given the plural corresponding to the AssociationEnd (e.g., AssocationEnd=feature, Reference=features).

Association Naming

Association Names contribute to the understanding of the Association. There is no method of generating meaningful association names (with the possible exception of composite Associations, given the name "Contains"). Therefore, either the modelers or other domain experts must provide a name for each Association.

1. When an association name is provided, it is used.
2. When no name is provided, the modeler or other domain expert must provide the name, except as described below.
3. When no name is provided, and the Association is composite, it may be given the name "Contains" (although a modeler-provided name is preferred).
4. When two associations in the same Package have the same name, the preferred resolution is to obtain another name from the modeler. In the absence of this resolution, a numeral may be appended to the conflicting name.

Note that meaningful names often need to obey the ordering of the AssociationEnds contained by the Association. The naming process should define that ordering, wherever it is not clearly defined.

Element Ordering

The ordering of elements within their containers is often not representable by the UML notation. Even if the modeling tool provides control over the ordering, then the total ordering in the MOF is not satisfied. For instance, within a Class, only the features are ordered. But in the MOF, all elements contained in a class are ordered, including constraints, nested classes and data types, and tags. Note that, except for the order of AssociationEnds in an association, there is no particular meaning to a specific ordering. However, wherever the MOF expects ordering, the order of elements must be defined and maintained.

1. Within a Classifier, the features will appear first, in the same order as the UML source. Other elements appear after, with the ordering recorded in some representation.
2. Within an Operation, the Parameters will appear first, in the same order as defined in the UML source. Other elements appear after, with the ordering recorded in some representation.
3. For a given operation, the Exceptions provided by raisedSignal are not defined. Some ordering must be defined, and retained in some representation.
4. For each Package, the order of elements must be defined and recorded in some representation.

Exceptions

The exceptions of an operation specified by an Association between Signals and Operations. Each Exception (a subclass of signal) is converted to a MOF Exception.

The attributes of the UML Exception are converted to parameters of the MOF Exception.

Constraints

Any constraints defined in the UML metamodel can be mapped in a very straight forward manner to the equivalent MOF constraint.

1. Actual Element Type would correspond to DTD generation rules, which probably includes the XMI.reference option.

Figure 1:
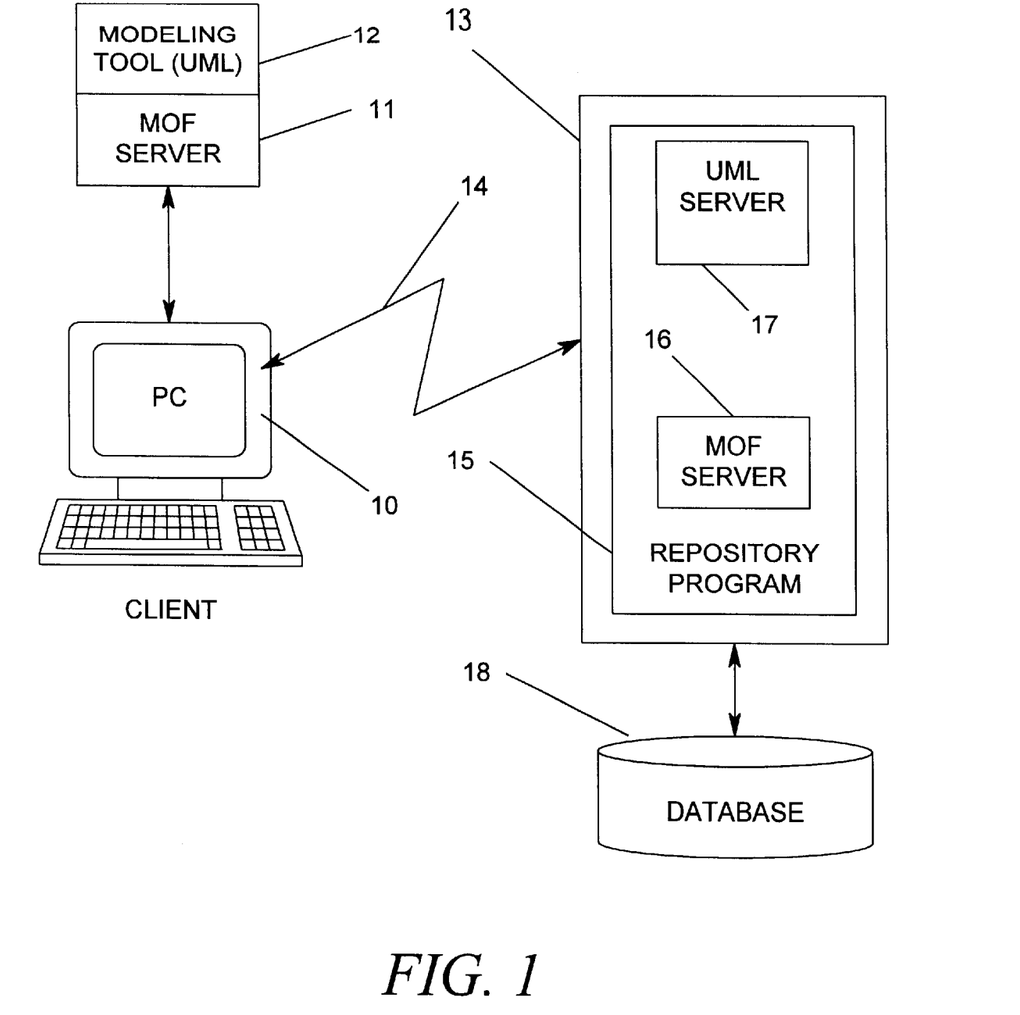
FIG. 1 is a block diagram of a system that may employ the present invention.

Referring now to FIG. 1, a block diagram of a computer system that may employ the present invention is shown. A PC or Client machine 10 is capable of executing such programs as a MOF Server 11 and a UML modeling tool 12. The Client machine 10 may be coupled to a Server machine 13 by means of a network 14. The Server machine 13 is capable of executing a repository program 15; and, within the repository program there exist a MOF Server 16 and a UML Server 17. The Server machine 13 is coupled to a database 18.

In the disclosed embodiment, the repository program 15 is a specialized, extensible object-oriented database application that adds value to a database system, which allows customization of a particular domain (such as application development).

The repository program 15 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, for TOOL-INDEPENDENT APPLICATION DEVELOPMENT; and, pending application Ser. No. 08/934,834, filed on Sep. 22, 1997, for EXCHANGING INFORMATION BETWEEN DIFFERENT OBJECT MODELS AND UML; each of which are hereby incorporated by reference as if set forth in full herein.

Figure 2:
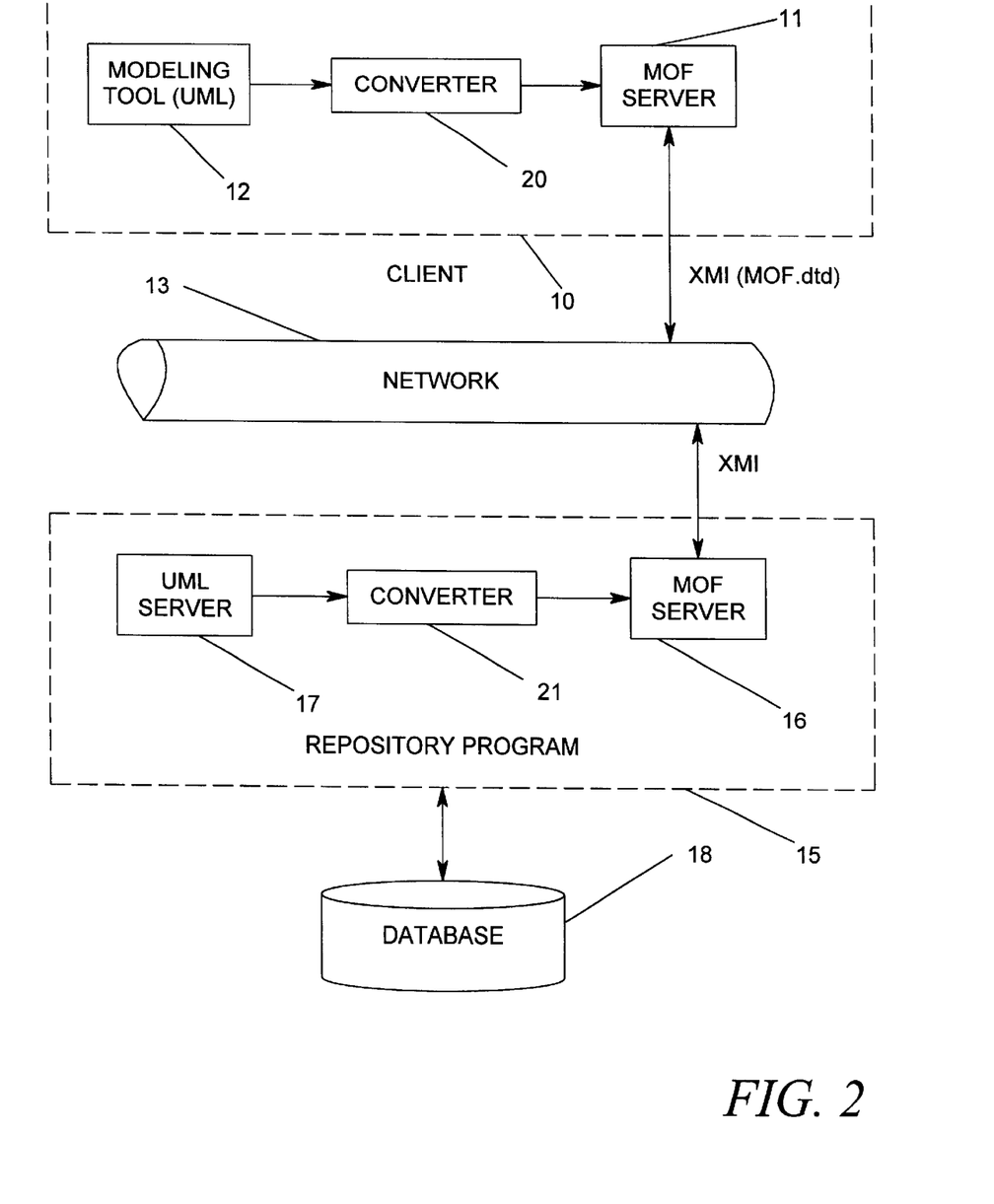
FIG. 2 is a software module block diagram of a system that may employ the present invention.

Referring now to FIG. 2, a block diagram illustrates the arrangement of software modules and their interconnections. Within the Client machine 10 is shown the UML modeling tool 12 communicating with the MOF Server through a converter 20, which includes the present invention and will be amplified further hereinafter. The MOF Server 11 communicates with the MOF Server 16 within the Server machine 15 by means of the network 13. More specifically, the communication is performed in XMI, based on a MOF DTD, which is "XML Metadata Interchange" and is disclosed in greater detail in co-pending U.S. patent application Ser. No. 09/282,345, entitled A METHOD AND SYSTEM FOR GENERATING A SIMPLE DOCUMENT TYPE DEFINITION FOR DATA INTERCHANGE AMONG SOFTWARE TOOLS, assigned to the same assignee hereof.

Within the Server machine 15, the MOF Server 16 communicates with the same network 13 and is adapted for receiving data in the XMI format. The UML Server 17 communicates with the MOF Server 16 by means of another converter 21, also in accordance with the present invention.

Figure 3:
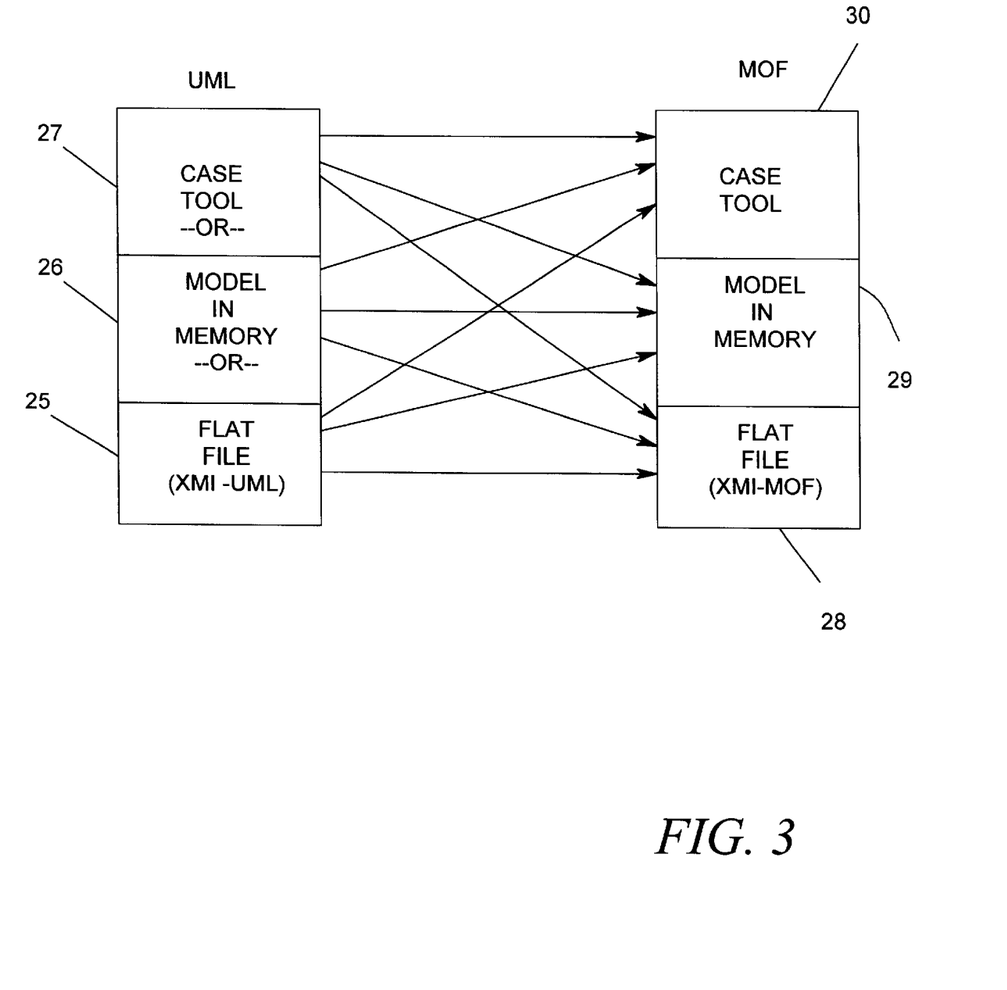
FIG. 3 is a conceptual diagram illustrating the conversion function performed by the present invention.

Referring now to FIG. 3, a conceptual diagram illustrating the conversion function performed by the present invention is shown. The UML model is shown on the left-hand side of the sheet of the drawing (when viewed in the convention manner) and the MOF model is shown on the right-hand side of the drawing. The UML model may exist in three different forms. It may be a flat file (XMI-UML) 25, a model 26 in the computer system memory, or it may be within a CASE tool 27. In a similar manner, the MOF model may exist in a flat file (XMI-MOF) 28, a model 29 in the memory, or it may be within a CASE tool 30.

FIG. 3 illustrates the fact that a flat file 25 form of the model may be converted by the method of the present invention to any one of the three forms of the MOF model, i.e., 28, 29 or 30. In a similar manner, the model 26 in the computer system memory may be converted into any one of the three forms of the MOF model, i.e., 28, 29 or 30. Moreover, the CASE tool UML model 27 may be converted into any one of the three forms of the MOF model, i.e., 28, 29 or 30.

Figure 4:
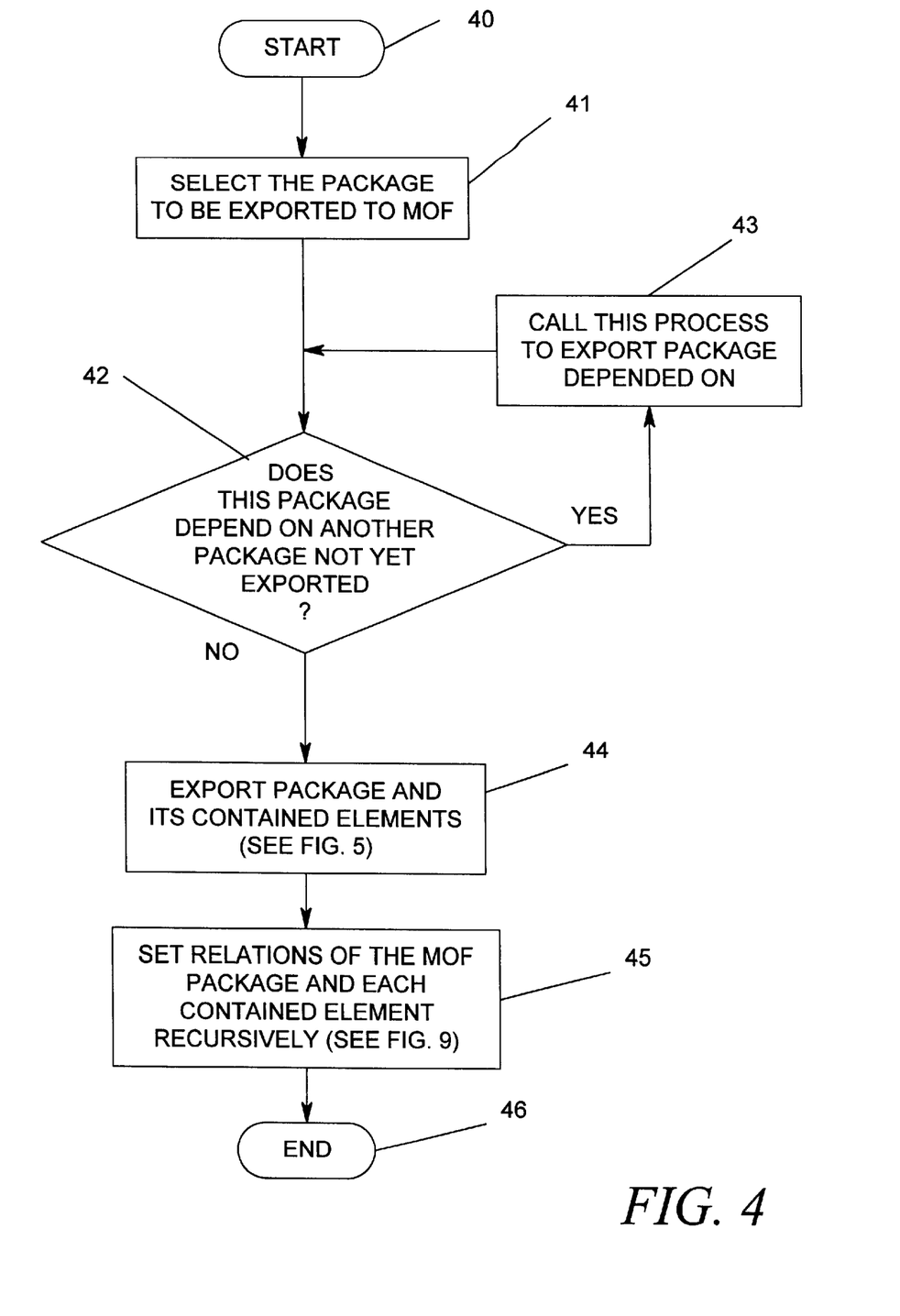
FIG. 4 is a high-level flow chart illustrating the method of the present invention.

Referring now to FIG. 4, a high-level flow chart illustrating the method of the present invention is shown. The method begins with a start bubble 40 followed by a step of selecting the package to be exported to MOF from the UML Server (block 41). Next, an inquiry is made as to whether or not the selected package depends on another package not yet exported (diamond 42). If the answer to this inquiry is yes, then this process (i.e., the process shown in FIG. 4) is called to export the package depended upon (block 43). After this, a return is made back to the diamond 42 to repeat the inquiry.

On the other hand, if the answer to the inquiry in the diamond 42 is no, then the package and its contained elements are exported (block 44). Details of the step depicted by the block 44 are set forth in FIG. 5 and amplified further hereinafter. Following the above, the relations of the package contained elements are set (block 45). Details of the step depicted by the block 45 are set forth in FIG. 9, and amplified further hereinafter.

Figure 5:
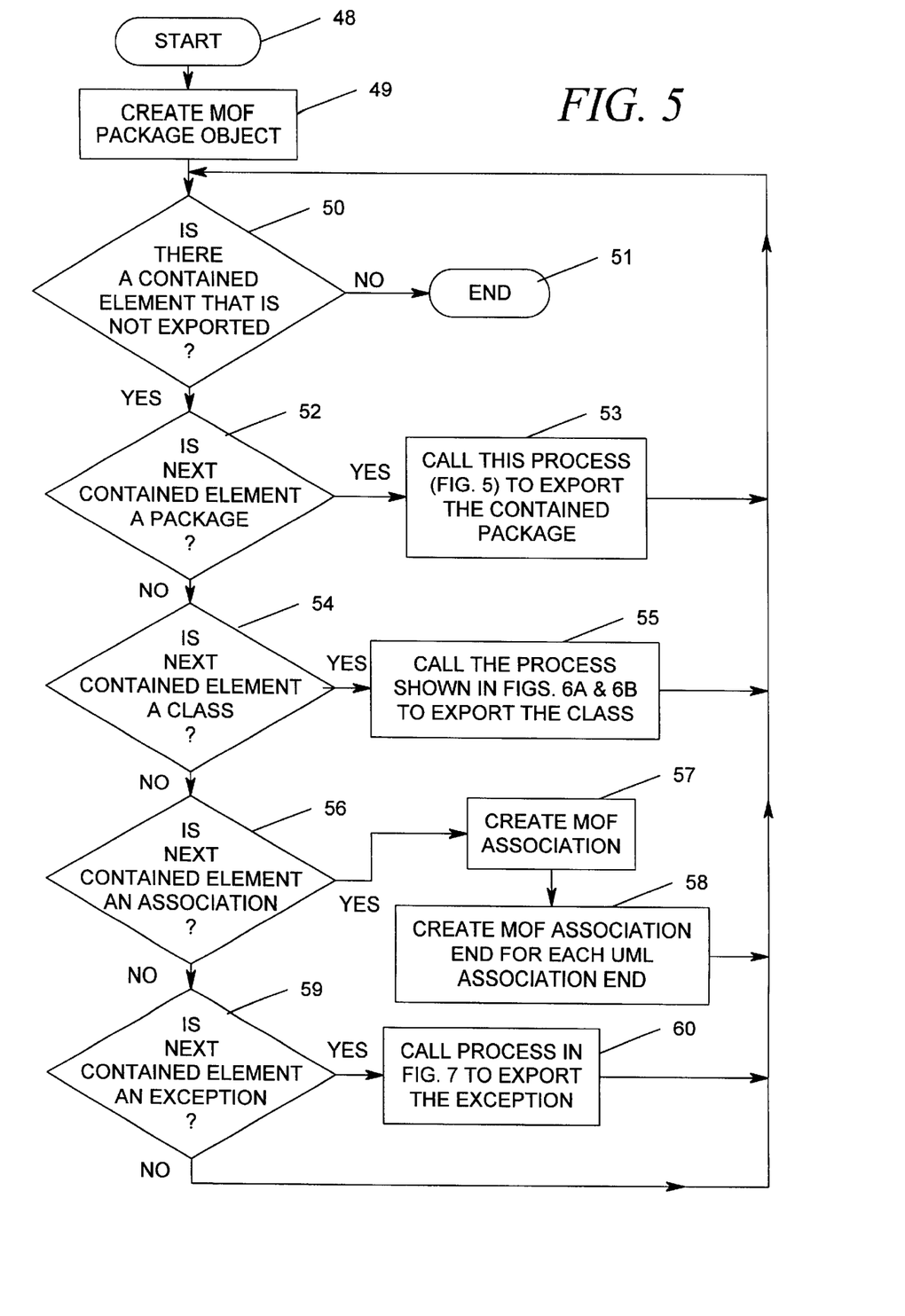
FIG. 5 is a flow chart of the process for exporting a package and its contained elements.

Referring now to FIG. 5, the flow chart for the process of exporting a package and its contained elements is shown. The process begins with a start bubble 48 followed by a step of creating a MOF package object (block 49). Next, an inquiry is made as to whether or not there is a contained element that has not been exported (diamond 50). If the answer to this inquiry is no, then the process ends (bubble 51). On the other hand, if the answer to this inquiry is yes, then another inquiry is made as to whether or not the next contained element is a package (diamond 52). If the answer to this second inquiry is yes, then this process (i.e., the process illustrated in FIG. 5) is called to export the contained package (block 53). After this, a return is made back to the diamond 50 for further processing.

Figure 6A:
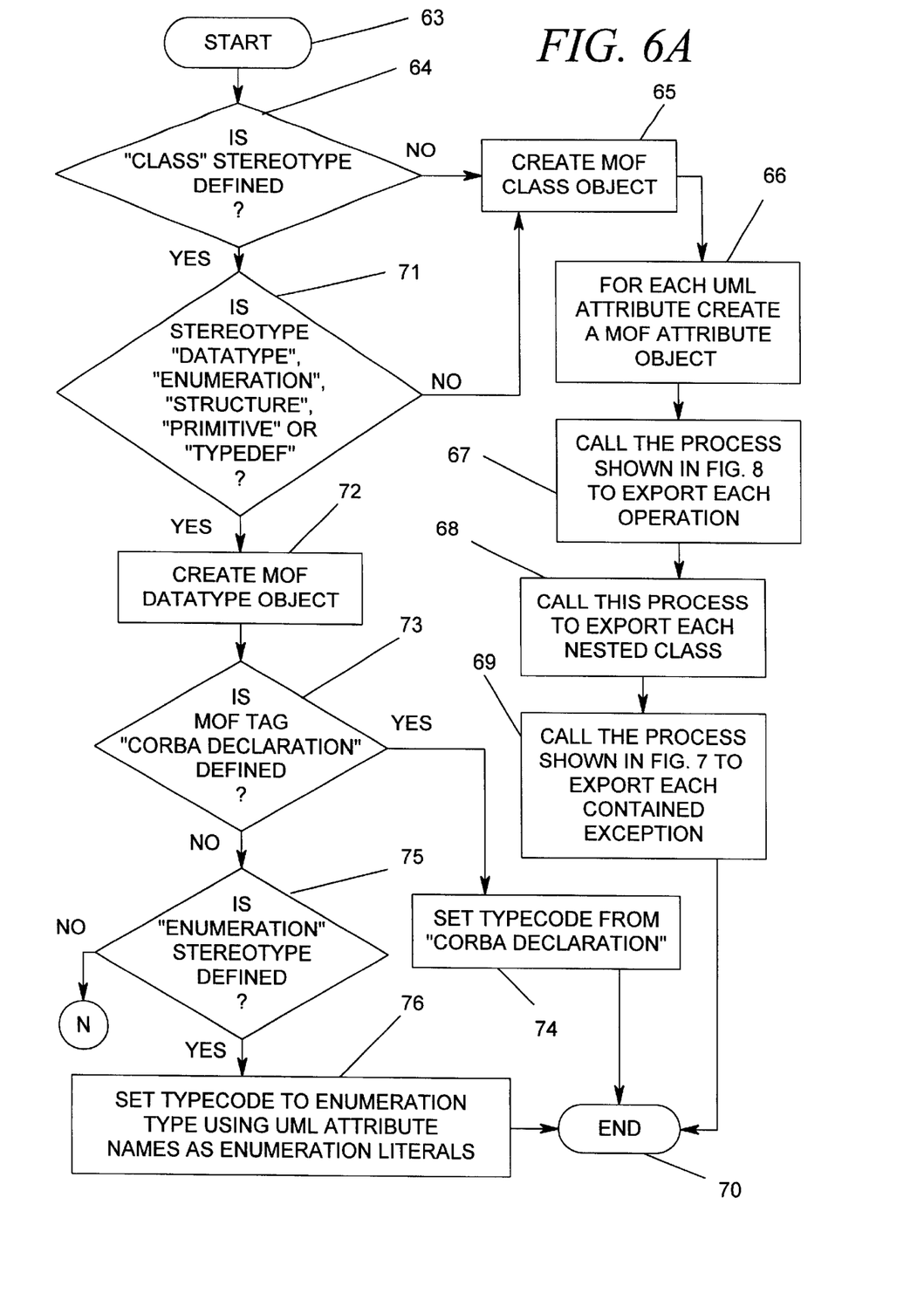
FIGS. 6A and 6B combined illustrate a flow chart of the process for exporting a class.
Figure 6B:
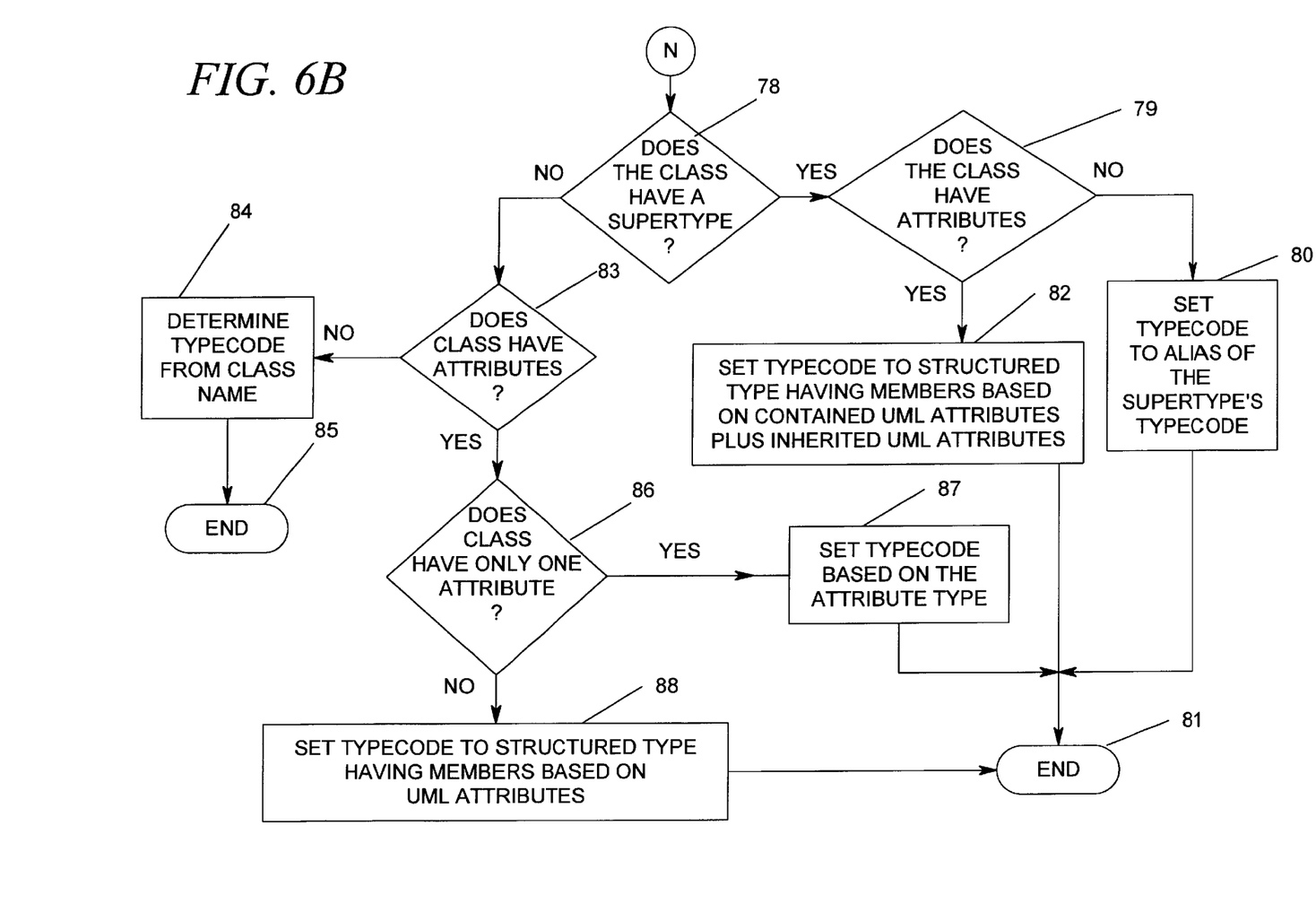

On the other hand, if the answer to this inquiry is no, then yet another inquiry is made as to whether or not the next contained element is a class (diamond 54). If the answer to this latter inquiry is yes, then the process shown in FIGS. 6A and 6B is called to export the class (block 55). After this, a return is made back to the diamond 50 for further processing. On the other hand, if the answer to this inquiry is no then still another inquiry is made as to whether or not the next contained element is an association (diamond 56). If the answer to this inquiry is yes, then a MOF association is created (block 57). Next, a MOF association end is created for each UML association end (block 58) and a return is made back to the diamond 50 for further processing.

Figure 7:
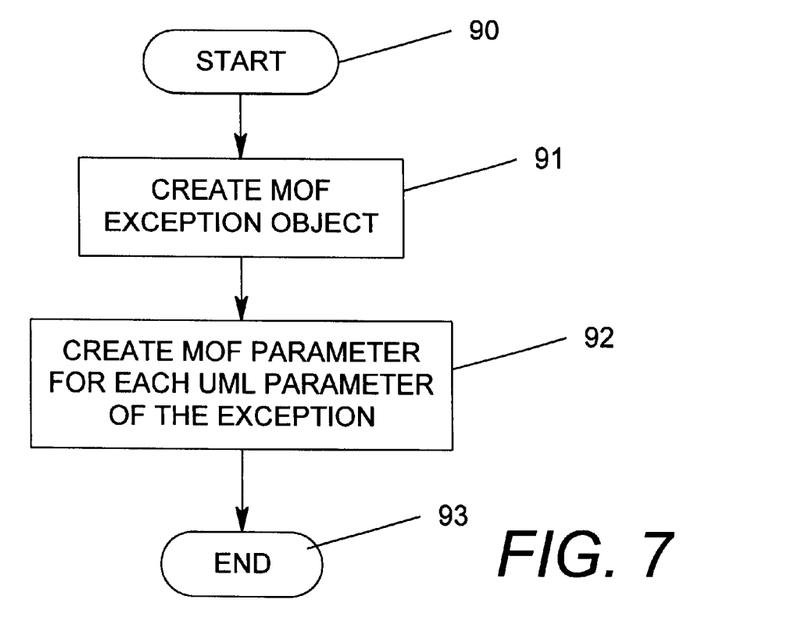
FIG. 7 is a flow chart of the process for exporting each contained exception.

On the other hand, if the answer to the inquiry in the diamond 56 is no, then another inquiry is made as to whether or not the next contained element is an exception (diamond 59). If the answer to this inquiry is yes, the process illustrated in FIG. 7 is called to export the exception (block 60). On the other hand, if the answer to this inquiry is no, then a return is made back to the diamond 50 for further processing.

Figure 8:
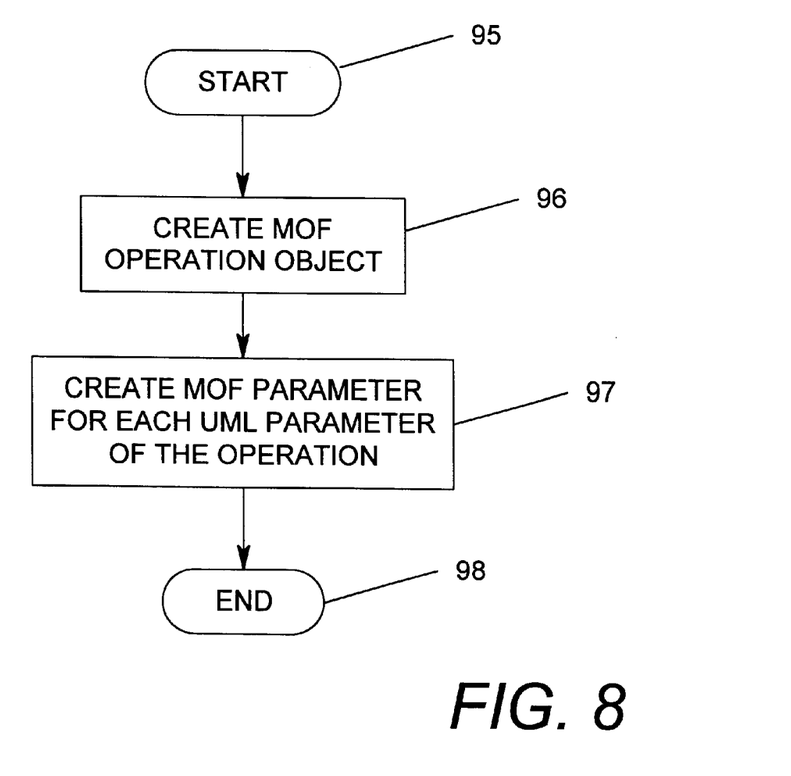
FIG. 8 is a flow chart of the process for exporting each operation.

Referring now to FIG. 6A, the first of a two-sheet drawing illustrates a flow chart for the process for exporting a class (block 55, FIG. 5) The process begins with a start bubble 63 followed by an inquiry as to whether or not "class" stereotype is defined (diamond 64). If the answer to this inquiry is no, then a MOF class object is created (block 65). Next, for each UML attribute a MOF attribute is created (block 66) and then the process shown in FIG. 8 is called to export each operation (block 67).

Following the above, this process (i.e., the process illustrated in FIG. 6A) is called to export each nested class (block 68) and the process shown in FIG. 7 is called to export each contained exception (block 69), whereupon the process ends (bubble 70). On the other hand, if the answer to the inquiry in the diamond 64 is yes, i.e., "class" stereotype is defined, then another inquiry is made as to whether or not stereotype is "datatype", "enumeration", "structure", "primitive" or "typedef" (diamond 71). If the answer to this inquiry is no, then a MOF class object is created (block 65) and all of the previously described steps depicted by the blocks 66, 67, 68, and 69 are repeated.

On the other hand, if the answer to this inquiry is yes, then a MOF datatype object is created (block 72) and yet another inquiry is made as to whether or not a MOF tag "CORBA Declaration" is defined (diamond 73). If the answer to this inquiry is yes, then the typecode from "CORBA Declaration" is set (block 74) and the process ends (bubble 70).

On the other hand, if the answer to the inquiry in the diamond 73 is no, then still another inquiry is made as to whether or not "enumeration" stereotype is defined (diamond 75). If the answer to this inquiry is yes, the typecode is set to enumeration type using UML attribute names as enumeration literals (block 76) and the process ends (bubble 70). On the other hand, if "enumeration" stereotype is not defined, then the process illustration continues in FIG. 6B as denoted by a connector N.

Referring now to FIG. 6B at the connector N, an inquiry is made as to whether or not the class has a supertype (diamond 78). If the answer to this inquiry is yes, then another inquiry is made as to whether or not the class has attributes (diamond 79). If the answer to this inquiry is no, then typecode is set to alias of the supertype's typecode (block 80). After this the process ends (bubble 81). On the other hand, if the class does have attributes, then typecode is set to structured type having members based on contained UML attributes plus inherited UML attributes (block 82). Following this step the process ends (bubble 81).

With reference to the inquiry in the diamond 78. If the class does not have a supertype, then another inquiry is made as to whether or not class has attributes (diamond 83). If the answer to this inquiry is no, then a primitive typecode from class name is determined (block 84) and the process ends (bubble 85). On the other hand, if the class does have attributes, then still another inquiry is made as to whether or not class has only one attribute (diamond 86). If the answer to this inquiry is yes, then typecode is set based on the attribute type (block 87) and the process ends (bubble 81). If class does not have only one attribute (diamond 86), then typecode is set to structured type having members based on UML attributes (block 88). After the process ends (bubble 81).

Referring now to FIG. 7, the process for exporting each contained exception is shown. The process begins with a start bubble 90 followed by a step of creating a MOF exception object (block 91). After this, a MOF parameter is created for each UML parameter of the exception is created (block 92). After this, the process ends (bubble 93).

Referring now to FIG. 8, the process for exporting each operation is shown. The process begins with a start bubble 95 followed by a step of creating a MOF operation object (block 96). After this, a MOF parameter is created for each UML parameter of the operation is created (block 97). After this, the process ends (bubble 98).

Figure 9:
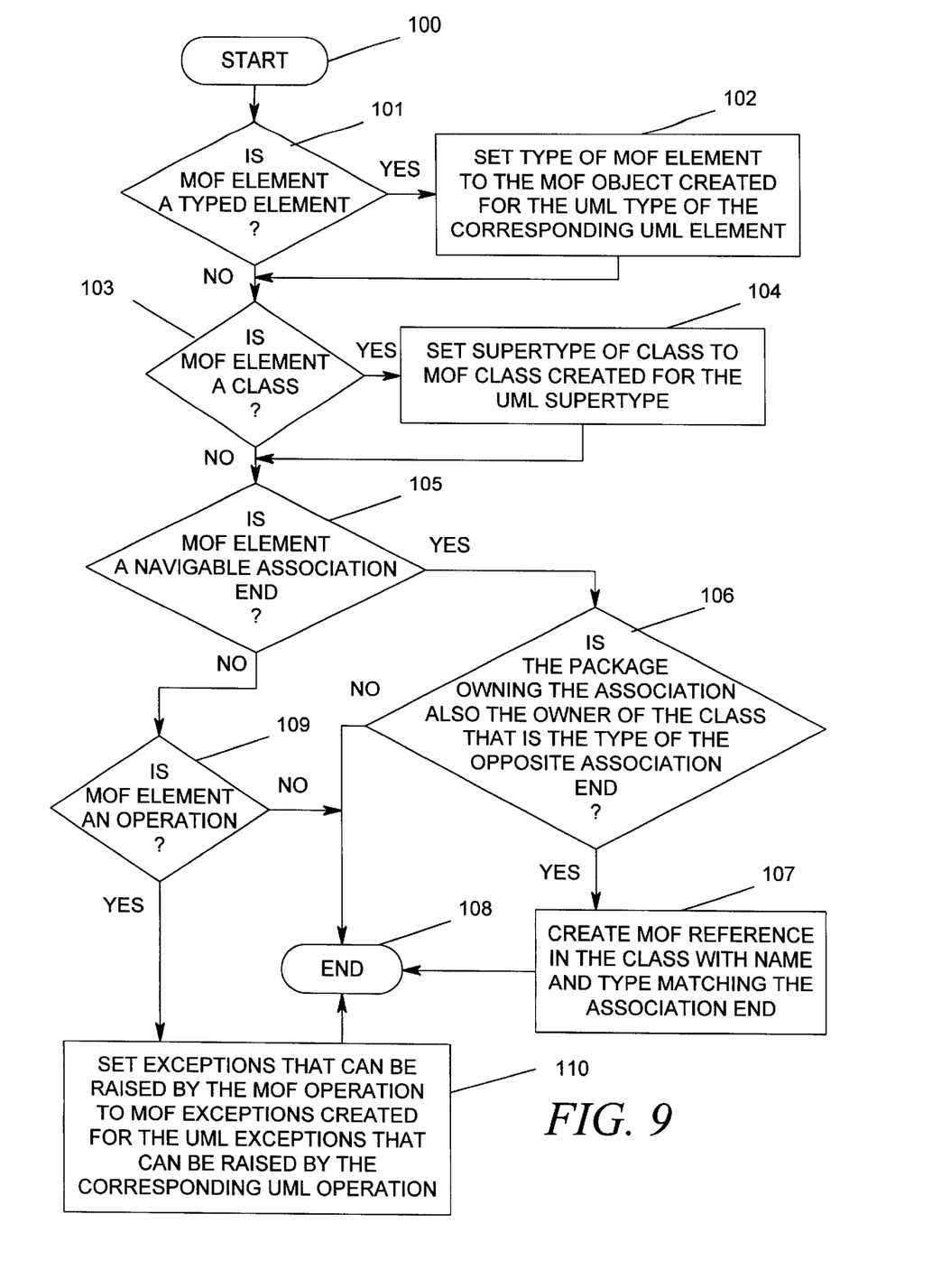
FIG. 9 is a flow chart of the process for setting relations of the MOF package and each contained element.

Referring now to FIG. 9, a flow chart of the process for setting relations of the MOF package and each contained element is shown. The process begins with a start bubble 100 followed by an inquiry as to whether or not MOF element is a typed element (diamond 101). If the answer to this inquiry is yes, then MOF element type is set to the MOF object created for the UML type of the corresponding UML element (block 102). On the other hand, if the answer to this inquiry is no, or upon completion of the step depicted by the block 102, then another inquiry is made as to whether or not MOF element is a class (diamond 103). If the answer to this inquiry is yes, then supertype of class is set to MOF class created for the UML supertype (block 104). On the other hand, if the answer to this inquiry is no, or upon completion of the step depicted by the block 104, then yet another inquiry is made as to whether or not MOF element is a navigable association end (diamond 105).

If the MOF element association end is navigable, then still another inquiry is made as to whether or not the package owning the association is also the owner of the class that is the type of the opposite association end (diamond 106). If the answer to this inquiry is yes, then a MOF reference is created in the class with the name and type matching the association end (block 107). On the other hand, if the answer to the inquiry in the diamond 106 is no, or upon completion of the step depicted by the block 107, the process ends (bubble 108).

Referring back to the inquiry depicted by the diamond 109, if the MOF element is not a navigable association end, then another inquiry is made as to whether or not MOF element is an operation (diamond 109). If the answer to this inquiry is no, then the process end (bubble 108). On the other hand, if the answer to this inquiry is yes, then exceptions that can be raised by the MOF operation is set to MOF exceptions created for the UML exceptions that can be raised by the corresponding UML operation (block 110).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computing system having a repository program being executed by said system and a means for storing data, a method for converting a UML model to a MOF model within said repository, said method comprising:

a. selecting a package within said UML model, hereafter UML package, to be exported to said MOF model;

b. exporting said UML package and its elements to said MOF model;

c. recursively setting relations between MOF objects of said UML package that correspond to relations between UML objects in said package; and, d. creating MOF reference objects for navigable MOF association ends.

2. The method as in claim 1, wherein said step of exporting said UML package further comprises:

for each element owned by said UML package, perform the following steps:
1) creating a MOF package object;
2) determining whether or not said UML package includes an element, and if so;
3) determining whether or not said element is a package, and if not;
4) determining whether or not said element is a class, and if not;
5) determining whether or not said element is an association, and if so;
6) creating a MOF association and a MOF association end for each UML association end.

3. The method as in claim 2, where it is determined in step 3) thereof that said element is a package, repeating all of the steps of claim 2 for exporting the contained package.

4. The method as in claim 2, where it is determined in step 5 thereof that said element is not an association, further comprising the steps of:

a. determining whether or not said element is an exception, and if not;

b. repeating all of the steps of claim 2.

5. The method as in claim 4, where it is determined that said element is not an association, further comprising the step of creating a MOF exception.

6. The method as in claim 1, where it is determined that said element is a class, further comprising the steps of:

a. determining whether or not class stereotype is defined, and if not;

b. creating a MOF class object; and c. for each UML attribute creating a MOF attribute object.

7. The method as in claim 6 further including the steps of:

a. creating a MOF operation object; and, b. creating a MOF parameter for each UML parameter of the operation.

8. The method as in claim 6 further including the steps of:

a. creating a MOF exception object; and, b. creating a MOF parameter for each UML parameter of the exception.

9. The method as in claim 2 wherein said step of determining whether or not said element is an association further includes:

a. determining whether or not said MOF element is a navigable association end, and if so;

b. determining if said UML package owning said association also the owner of the class that is the type of the opposite association end, and if so;

c. creating a MOF reference in said class with name and type matching said association end.

10. The method as in claim 9 where in step a thereof it is determined that said MOF element is not a navigable association end, further comprising the steps of:

a. determining whether or not said MOF element is an operation, and if so;

b. setting exceptions that can be raised by the MOF operation to MOF exceptions created for UML exceptions that can be raised by the corresponding UML operation.

11. The method as in claim 1, where it is determined that said element is a class and stereotype is defined, further comprising the steps of:

a. determining if stereotype is a datatype, and if so;

b. creating a MOF data type object.

12. The method as in claim 1, where it is determined that said element is a class and stereotype is defined, further comprising the steps of:

a. determining if stereotype is an enumeration, and if so;

b. setting type code to enumeration type using UML attribute names as enumeration literals.

13. The method as in claim 1, where it is determined that said element is a class and stereotype is defined, further comprising the steps of:

a. determining if stereotype is a structure, and if so;

b. determining if said class has a supertype, and if so;

c. determining if said class has attributes, and if so;

d. setting typecode to structured type having members based on UML attributes plus inherited UML attributes.

14. In a computing system having a repository program being executed by said system and a means for storing data, a system for converting a UML model to a MOF model within said repository, said system comprising:

a. means for selecting a package within said UML model, hereafter UML package, to be exported to said MOF model;

b. means for exporting said UML package and its elements to said MOF model;

c. means for recursively setting relations between MOF objects of said UML package that correspond to relations between UML objects in said package; and, d. means for creating MOF reference objects for navigable MOF association ends.

15. A storage medium encoded with machine-readable computer program code for converting a UML model to a MOF model, wherein, when said computer program code is executed by a computer, said computer performs the steps of:

a. selecting a package within said UML model, hereafter UML package, to be exported to said MOF model;

b. exporting said UML package and its elements to said MOF model;

c. recursively setting relations between MOF objects of said UML package that correspond to relations between UML objects in said package; and, d. creating MOF reference objects for navigable MOF association ends.

16. The storage medium as in claim 15, wherein said step of exporting said UML package further comprises:

for each element owned by said UML package, perform the following steps:
1) creating a MOF package object;
2) determining whether or not said UML package includes an element, and if so;
3) determining whether or not said element is a package, and if not;
4) determining whether or not said element is a class, and if not;
5) determining whether or not said element is an association, and if so;
6) creating a MOF association and a MOF association end for each UML association end.

17. The storage medium as in claim 16, where it is determined in step 3) thereof that said element is a package, repeating all of the steps of claim 16 for exporting the contained package.

18. The storage medium as in claim 16, where it is determined in step 5 thereof that said element is not an association, further comprising the steps of:
   a. determining whether or not said element is an exception, and if not;
   b. repeating all of the steps of claim 2.

19. The storage medium as in claim 18, where it is determined that said element is not an association, further comprising the step of creating a MOF exception.

20. The storage medium as in claim 16 wherein said step of determining whether or not said element is an association further includes:
   a. determining whether or not said MOF element is a navigable association end, and if so;
   b. determining if said UML package owning said association also the owner of the class that is the type of the opposite association end, and if so;
   c. creating a MOF reference in said class with name and type matching said association end.

21. The storage medium as in claim 15, where it is determined that said element is a class, further comprising the steps of:
   a. determining whether or not class stereotype is defined, and if not;
   b. creating a MOF class object; and
   c. for each UML attribute creating a MOF attribute object.

22. The storage medium as in claim 21 further including the steps of:
   a. creating a MOF operation object; and,
   b. creating a MOF parameter for each UML parameter of the operation.

23. The storage medium as in claim 21 further including the steps of:
   a. creating a MOF exception object; and,
   b. creating a MOF parameter for each UML parameter of the exception.

24. The storage medium as in claim 22 where in step a thereof it is determined that said MOF element is not a navigable association end, further comprising the steps of:
   a. determining whether or not said MOF element is an operation, and if so;
   b. setting exceptions that can be raised by the MOF operation to MOF exceptions created for UML exceptions that can be raised by the corresponding UML operation.

25. The storage medium as in claim 15, where it is determined that said element is a class and stereotype is defined, further comprising the steps of:
   a. creating a MOF data type object; and,
   b. setting type code to enumeration type using UML attribute names as enumeration literals.

\* \* \* \* \*